May 12, 1964   W. J. GREENE ETAL   3,133,186
SEAM FOLLOWER
Filed June 22, 1961   6 Sheets-Sheet 1

INVENTORS
WILLIAM J. GREENE
PHILIP F. BEISCHER
BY
*Leslie C. Bryan*
ATTORNEY

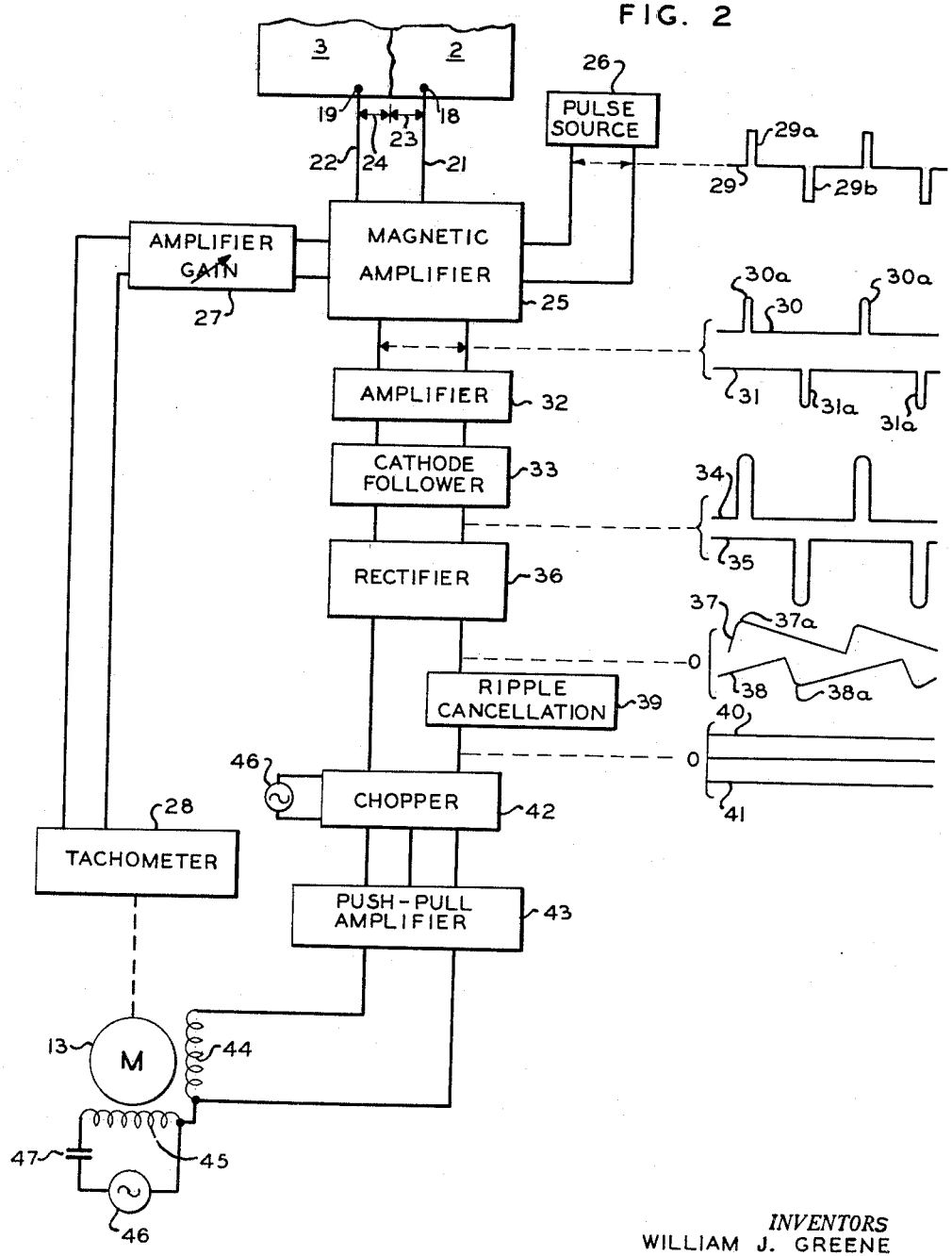

INVENTORS
WILLIAM J. GREENE
PHILIP F. BEISCHER
BY
Leslie C. Byer
ATTORNEY

May 12, 1964  W. J. GREENE ETAL  3,133,186
SEAM FOLLOWER

Filed June 22, 1961  6 Sheets-Sheet 5

FIG. 13

*INVENTORS*
WILLIAM J. GREENE
PHILIP F. BEISCHER
BY Leslie C. Bryan
ATTORNEY

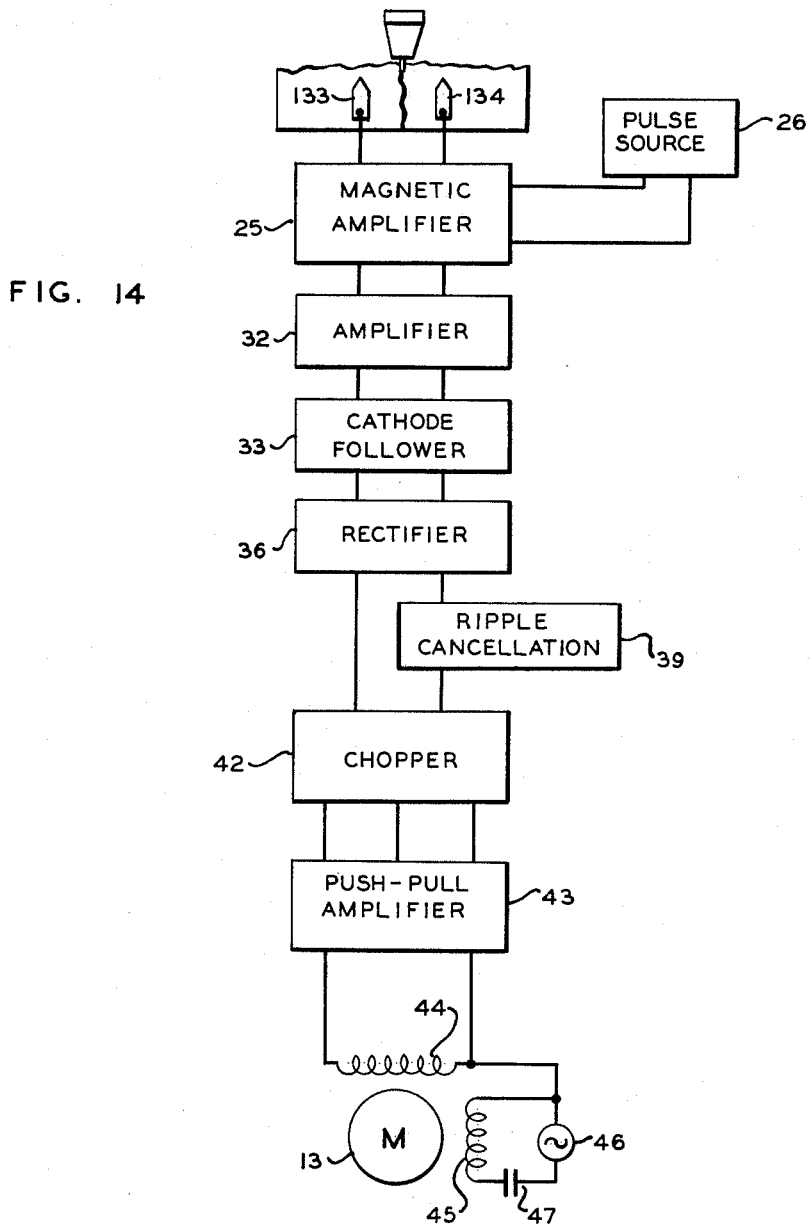

United States Patent Office 3,133,186
Patented May 12, 1964

3,133,186
SEAM FOLLOWER
William J. Greene, Scotch Plains, and Philip F. Beischer, Belleville, N.J., assignors to Air Reduction Company, Incorporated, New York, N.Y., a corporation of New York
Filed June 22, 1961, Ser. No. 118,893
13 Claims. (Cl. 219—125)

This invention relates to electric arc welding apparatus, and in particular to apparatus for controlling automatically the movement of a welding electrode along a seam to be welded to ensure that the electrode follows the seam.

There is disclosed in Patent No. 2,944,141 issued to R. T. Lovrenich on July 5, 1960, an electric arc welding apparatus which follows a seam by controlling a motor driving the welding electrode transversely of the seam in response to the potential difference due to the welding current between two pickup points on the respective workparts being welded, said pickup points being located on opposite sides of the seam near the finishing end thereof. By the finishing end is meant the last end of the seam to be welded.

It has been found, as a result of experience with apparatus of the type disclosed by Lovrenich, that that apparatus tends to hunt. In other words, the welding electrode oscillates from one side to the other of the seam between the workparts, rather than following the seam closely. This oscillation is particularly noticeable near the finishing end of the seam.

It is an object of the present invention to provide welding apparatus including an improved seam following mechanism of the type described.

Another object of the invention is to provide a seam following mechanism in which hunting of the electrode between the opposite sides of the seam is minimized.

The foregoing and other objects of the invention are attained in the apparatus described herein, of which two principal modifications are shown and described. In the first principal modification, the controlling signal is derived from two points equally spaced on opposite sides of the finishing end of the seam. Since these two points are a long distance from the welding arc at the beginning of a weld, and a short distance from the arc at the finishing of the weld, it may be seen that the potential difference between those points, due to the welding current, is very small at the beginning end of the weld and increases in amplitude towards the finishing end of the weld. This signal is fed to an amplifier designed to respond to weak signals. Automatic gain control means are provided for reducing the output of the amplifier as the electrode approaches the finishing end of the weld. Several modified forms of gain control means are shown and described. This first principal embodiment and these modifications, are suitable for use only in connection with seams between workpieces which are symmetrical with respect to the seam to be welded.

The second principal embodiment of the invention picks up, as an electrical signal, the potential between two contacts which move with the electrode on either side thereof and forcibly engage the workparts being welded. This modification of the invention is not limited with respect to the contour of the seam which it may follow, nor is it limited with respect to the symmetry or lack thereof between the workparts being welded. Furthermore, no automatic gain control is required.

Other objects and advantages of the invention will become apparent from a consideration of the following specification and claims, taken together with the accompanying drawings, in which:

FIG. 2 is a block diagram of an amplifier and motor control system used in the apparatus of FIG. 1;

FIG. 13 illustrates another modification of the invention, employing a somewhat different signal pickup mechanism; and FIG. 14 is a block diagram of amplifying and motor control apparatus which may be used with the apparatus of FIG. 13, and which utilizes generally certain components of the apparatus of FIG. 2.

*FIG. 1*

Figure 1:
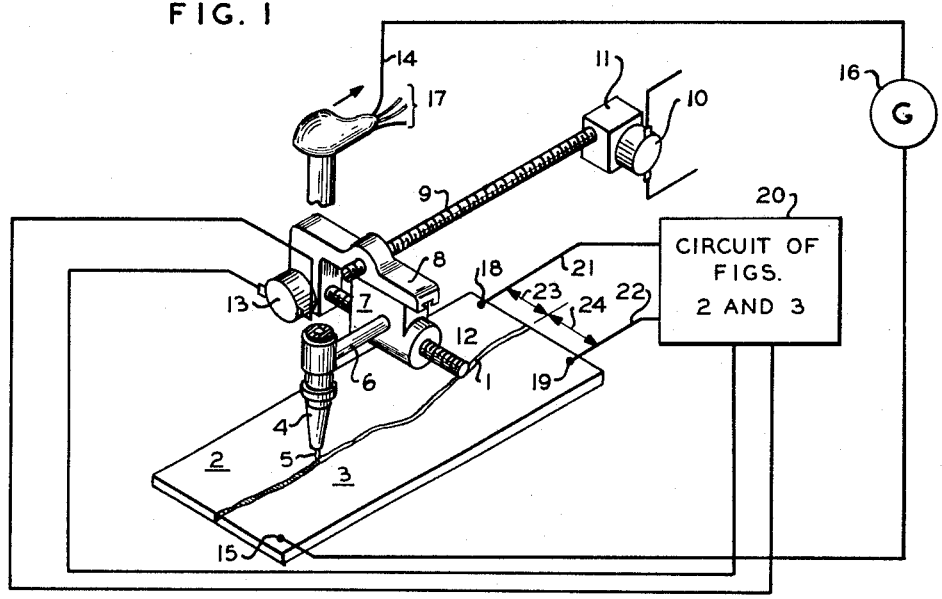
FIG. 1 is a view, partly in perspective and partly diagrammatic, illustrating one form of welding apparatus embodying the invention.

This figure illustrates electric welding apparatus which may be controlled in accordance with the present invention to follow a seam 1 between two workparts 2 and 3. The welding apparatus includes a head 4 from which an electrode wire 5 projects downwardly toward the seam 1. The head 4 is mounted by means of a bracket 6 on a slide 7 which is in turn supported by a carriage 8. The carriage 8 may be driven longitudinally of the seam 1 by means of a lead screw 9 threadedly engaging the carriage 8 and driven by a motor 10 through suitable gearing diagrammatically indicated at 11.

The slide 7 is driven transversely of the seam 1 by means of a lead screw 12 which threadedly engages the slide 7 and is driven by an electric motor 13 through suitable gearing (not shown) located in the carriage 8.

Motor 10 is commonly driven at a constant speed selected in accordance with the characteristics of the workparts 2 and 3 and of the particular weld structure which it is desired to make.

Any suitable welding head 4 may be employed. The welding head may, for example, be constructed as illustrated and described in U.S. Patent No. 2,512,705, granted to Nelson E. Anderson and George R. Turbett on June 27, 1950, entitled "Fluid-Cooled Gas-Blanketed Arc Welding Torch." Welding current is supplied to the electrode 5 through a welding cable 14 and through a ground connection 15 on one or both of the workparts. The cable 14 and the ground connection 15 are connected through suitable wires to a welding generator diagrammatically shown at 16.

Cooling fluid and inert shielding gas are supplied to the welding head 4 through hoses 17.

The present invention is concerned with apparatus for controlling the motor 13 to drive the head 4 transversely of the seam so as to make the welding arc follow the seam as the head 4 is moved longitudinally of the seam by the motor 10. The control of the motor 13 must be sufficiently accurate so that the arc will follow minor irregularities in the contour of the seam.

When a weld is being made, the welding current from the electrode 5 flows through the workparts 2 and 3 to the ground connection 15. This welding current spreads out through the workparts and produces a distribution of electrical potential in those workparts which may be readily measured at substantial distances (for example, about 6 feet) from the arc itself. If the two workparts are symmetrical with respect to the seam, or substantially so, then the potential fields in the two workparts are also symmetrical as long as the arc remains on the seam. The electrical potential between two points such as the pickup points 18 and 19, located at the finishing edge of the workparts 2 and 3, respectively, is then zero, since both points 18 and 19 are at the same potential. If the arc moves off the seam to one side or the other, then the electrical potential at one of the pickup points 18 and 19 will be greater than at the other and part of the welding current will flow through an external circuit diagrammatically indicated at 20 in FIG. 1 through wires 21 and 22 connected to the pickup points 18 and 19. The direction of flow of this current will depend upon the direction in which the electrode moves away from the seam. This current may be utilized as a signal to control a larger current supplied to the motor 13 so as to determine the direction and speed of that motor to drive the lead screw 12 in a direction to restore the carriage 8 to a position where the arc at the electrode 5 is aligned with the seam 1.

It is essential for the proper operation of the control system that the dimension 23 between the pickup point 18 and the seam 1 be substantially equal to the dimension 24 between the pickup point 19 and the seam 1. For example, it has been found that with pickup points spaced two inches apart, i.e., each pickup point being one inch from the seam, it is necessary that each point be located accurately within a tolerance of about $\frac{1}{16}''$. An error in this spacing introduces an error in the control signal which increases as the welding arc approaches the pickup point and which tends to make the arc move to one side or the other of the seam.

Figure 3A:
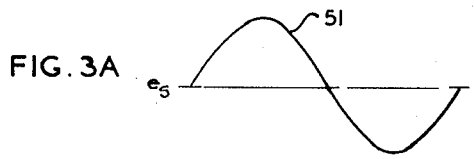
FIGS. 3A to 3E illustrate graphically various wave forms which occur in the circuits of FIG. 3.
Figure 3B:
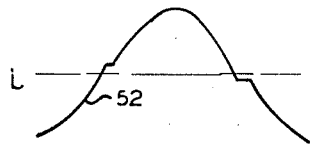
Figure 3C:
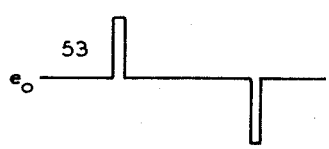
Figure 3D:
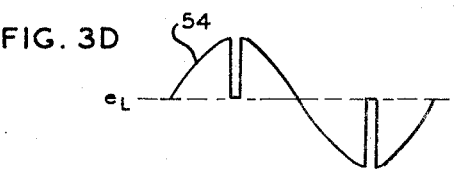
Figure 3E:
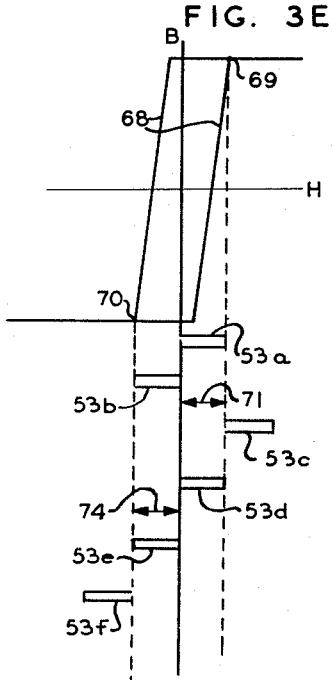
Figure 3:
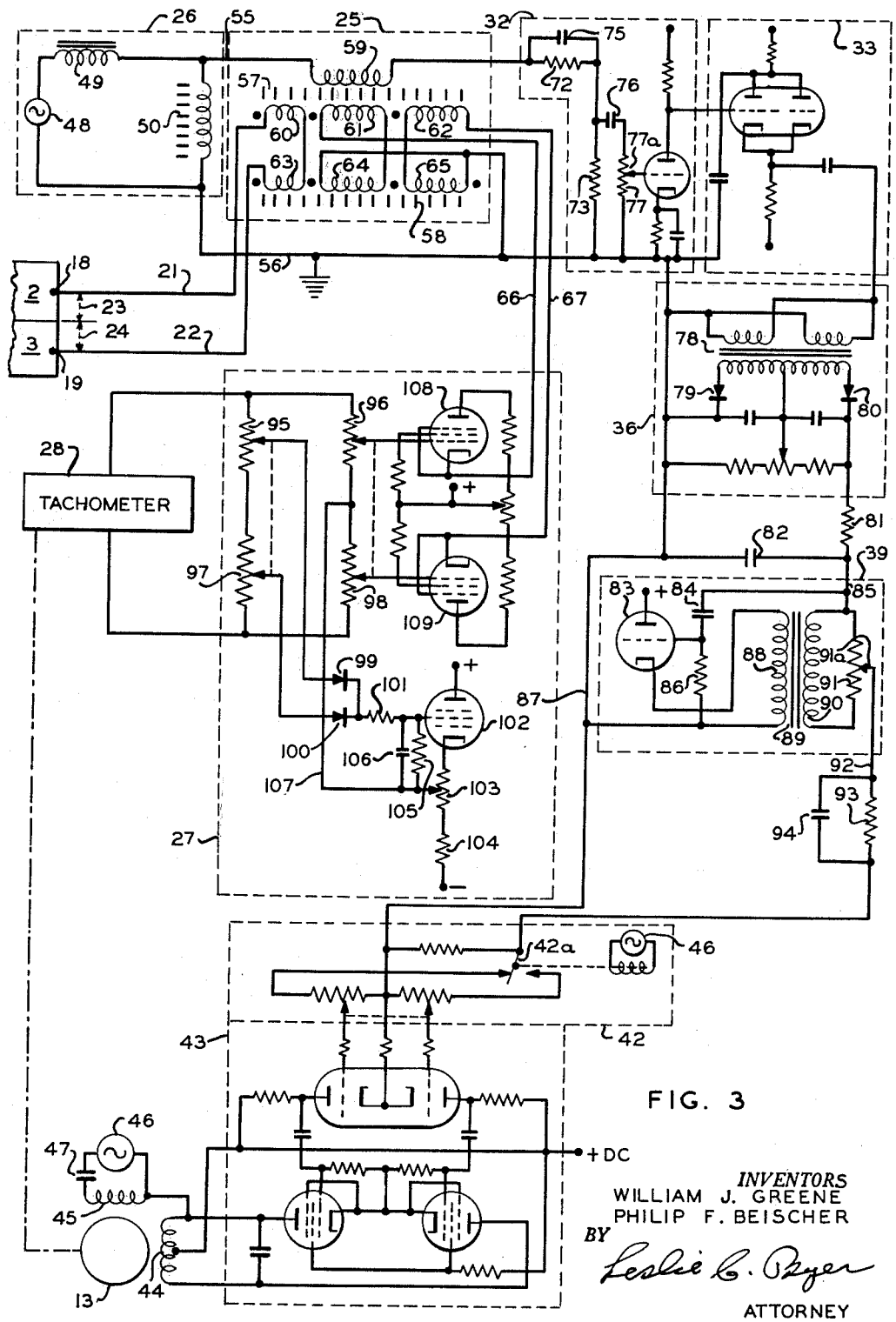
FIG. 3 is a detailed wiring diagram of the amplifier and motor control apparatus of FIG. 2.

FIGS. 2 and 3

FIG. 2 is a block diagram of a circuit for controlling the motor 13 in response to the electric current flowing between the pickup points 18 and 19. The circuit will first be described in general terms in connection with FIG. 2 and will then be described in greater detail in connection with FIG. 3.

Referring to FIG. 2, the current between the pickup points 18 and 19 flows through wires 21 and 22 to a magnetic amplifier generally indicated at 25. The amplifier 25 receives a power input from a pulse source 26 and another signal input from a variable gain amplifier 27 driven by a signal from a tachometer 28.

The pulse source 26 supplies a square wave 29 including pulses 29a, 29b of alternately opposite polarities separated by relaxation intervals wherein there is no output signal and which are substantially longer than the pulses 29a, 29b.

When there is no input signal to the magnetic amplifier 25 from the pickup points 18 and 19, that amplifier is effective to produce substantially no output signal. When a current flows through the magnetic amplifier between points 18 and 19, it is effective to reduce the impedance of the amplifier so as to pass the sets of square wave pulses of one polarity or the other, depending upon the direction of flow of the current between the pickup points 18 and 19. The output of the magnetic amplifier 25 appears either as shown at 30, consisting of spaced pulses 30a of one polarity, or as shown at 31, consisting of spaced pulses 31a of the opposite polarity. These pulses are then amplified by an amplifier 32 and a cathode follower 33, consequently appearing either as shown at 34 or as shown at 35. The signal still consists of pulses separated by relatively long relaxation times. Such a signal is not suitable for driving a conventional motor, particularly on account of the presence of the long relaxation times. The remainder of the apparatus in FIG. 2 is utilized to convert the signal of line 34 or line 35 into an alternating current signal suitable for driving a conventional motor.

The signal 34 or 35 is first rectified by a rectifier 36, resulting in a direct current signal 37 or 38 which has a substantial ripple component 37a or 38a. This signal is then put through a ripple cancellation circuit 39, resulting in a substantially smooth D.C. signal of one polarity or the other, as indicated at 40 or 41. This direct current signal is then converted into alternating current by a conventional chopper 42, whose output is fed to a push-pull amplifier stage 43. The output of the amplifier stage 43 is fed to one winding 44 of the motor 13. The motor 13 is shown as a two-phase motor, having its second phase winding 45 fed from an alternating current source 46 through a capacitor 47. The source 46 preferably also drives the chopper 42. The capacitor 47 introduces a substantially 90° phase shift between the source 46 and the winding 45. The output of the amplifier 43 is either in phase with the source 46 or of the opposite phase, and consequently runs the motor 13 in one direction or the other, depending upon the polarity of the input signal to the chopper 42.

The tachometer 28 generates a signal which is fed to a variable gain amplifier 27 whose output is connected to the input of a magnetic amplifier 25. The amplifier 27 is arranged so that it produces substantially no output until the tachometer exceeds the predetermined level. Thereafter it produces an output signal which tends to oppose the signal from the pickup points 18 and 19. The purpose of this gain control signal is to compensate for the increasing signal strength from the pickup points 18 and 19 as the welding arc approaches the finishing edge of the workparts on which the pickup points 18 and 19 are located.

Referring now to FIG. 3, the pulse source 26 comprises a source 48 of alternating current, an inductor 49 having a non-saturating core, and an inductor 50 having a saturable core. The two inductors and the source are connected in the series loop. The output is taken across the terminals of the saturable inductor 50.

The potential of the source 48 may be a typical sine wave, as shown at 51 in FIG. 3A. Since the load in the loop circuit is almost completely inductive, the current in the loop lags the potential by about 90 electrical degrees and appears as shown at 52 in FIG. 3B. Each time the current reverses in polarity, the core 50 shifts from saturation in one direction to saturation in the opposite direction. During that shift in saturation, almost the entire potential of the source 48 appears across the inductor 50, producing the spaced pulses of alternate polarities shown at 53 in FIG. 3C. When the core of inductor 50 saturates, that inductor becomes a very low impedance. During the remainder of the cycle substantially the entire potential of the source 48 appears as a potential drop across inductor 49, as shown at 54 in FIG. 3D.

There is thus produced across the terminals of saturable inductor 50 the square wave output shown at 53 in FIG. 3C, which is supplied as a power input to the magnetic amplifier 25 through a wire 55 and a grounded wire 56.

The magnetic amplifier 25 is of a type sometimes known as a pulse relaxation amplifier. As shown, the amplifier 25 includes two saturable cores 57 and 58, which are typically ring-shaped, although shown linear in the drawing for convenience. The core 57 has an output winding 59 and three input windings 60, 61 and 62. The core 58 has three windings 63, 64 and 65 and is provided to block substantially the feedback of energy from the load winding 59 into the circuits of the input windings 60, 61 and 62.

The windings 60 and 63 are connected in series with the wires 21 and 22 leading to the pickup points 18 and 19. The windings 64 and 61 are connected in series between the grounded wire 56 and a wire 66 forming a signal input wire from the variable gain amplifier 27. The windings 65 and 62 are connected in series between the grounded wire 56 and another wire 67 which serves as the other signal input wire from the variable gain amplifier 27.

The arrangement is such that any alternating current produced in windings 60, 61 and 62 by virtue of current flowing in the winding 59 is opposed and bucked down by the alternating potentials induced in the windings on core 58, so that the signal input circuits connected externally of the amplifier 25 between wires 21 and 22 and also between wires 66 and 67 cannot act as loads on the winding 59.

The material and dimensions of the core 57 are so selected that when the windings 60, 61 and 62 are not energized, the square wave pulses 53 (FIG. 3E) supplied from the pulse source 26 are just effective to switch the core 57 back and forth between its two saturated conditions. The winding 59 remains at a high impedance throughout such an operation, so that the signal supplied to the output load on magnetic amplifier 25 is effectively zero. On the other hand, when one of the control windings 60, 61 and 62 is supplied with a direct current, the core 57 becomes partially magnetized in one sense or the other. Under such conditions, when the pulses 53 are supplied to the winding 59, the core 57 is substantially saturated during at least a portion of the pulses of one polarity and substantial output signals flow through winding 59 during those pulse portions. The pulses of opposite polarity are not effective to produce output signals, but only switch the core back toward its opposite state of saturation.

The operation of the amplifier 25 may be understood more clearly by reference to FIG. 3E, where the curve 68 illustrates a typical "square" hysteresis loop, which may be the hysteresis loop of the core 57. When no current flows in the control windings 60, 61 and 62, the input pulses from the pulse source 26 have magnetizing forces appearing as at 53a, 53b in FIG. 3E, and are effective to switch the core between its condition of positive saturation indicated by the intersection 69 and its condition of negative saturation indicated by the intersection 70. When a current is flowing in the winding 60 of a magnitude sufficient to produce a magnetizing force of the value indicated at 71 in FIG. 3E, then the magnetizing forces due to the pulses 53 are superimposed on the magnetizing force 71, and appear as shown at 53c and 53d. The pulse 53c now occurs when the core 57 is saturated in the same direction as that pulse and consequently passes through the winding 59 with little attenuation and appears as an output signal across the load resistors 72 and 73. The pulse 53d, on the other hand, is effective to drive the core 57 back toward its opposite condition of saturation and does not produce any substantial pulse of output current in the resistors 72 and 73. Similarly, if the magnetizing force of the current in winding 60 is of the opposite polarity and has a value as indicated at 74 in FIG. 3E, then the positive-going pulse 53e is not effective to produce an output signal, but the negative-going pulse 53f is so effective. (The operation of the gain control windings 61 and 62 is discussed below.)

In the amplifier 32, resistors 72 and 73 are connected in series with the winding 59 of the magnetic amplifier 25, and act as a load on the magnetic amplifier. A capacitor 75 is connected in parallel with the resistor 72. Another capacitor 76 and a resistor 77 in series is connected between the junction of resistors 72 and 73 and ground. The input signal for the amplifier 32 is taken from a movable tap 77a on the resistor 77. The amplifier 32 is a typical triode amplifier circuit, as shown in the drawing, and need not be further described.

The cathode follower 33 represents a power amplifier stage following the amplifier 32. The cathode follower 33 is typical of such circuits as shown in the drawing and a detailed description of it is believed to be unnecessary.

The output of the cathode follower 33 is coupled through a transformer 78 to a full wave rectifier circuit of conventional form, illustrated at 36 and comprising two diodes 79 and 80.

The output of the rectifier 36 is fed through a filter consisting of a resistor 81 and a capacitor 82 to a ripple cancellation circuit 39. This circuit includes a triode 83 having its grid connected through a capacitor 84 and the wire 85 to the junction between resistor 81 and capacitor 82. The grid of triode 83 is also connected through a resistor 86 to a grounded conductor 87. The cathode of triode 83 is connected through the primary winding 88 of a transformer 89 to the grounded conductor 87. Transformer 89 has a secondary winding 90 across which is connected a resistor 91 provided with a slidable tap 91a by means of which a selected portion of the resistor 91 may be placed in series with the input signal at wire 85. The anode of triode 83 is connected to a suitable source of positive electrical potential.

Any alternating component in the potential appearing at wire 85 is passed through capacitor 84 to the grid of triode 83, where it is amplified and delivered through the transformer 89 to appear in inverted form across the resistor 91. By positioning the tap 91a so that the ripple signal appearing across the portion of the resistor 91 between tap 91a and wire 85 is exactly equal and opposite to the ripple signal appearing at wire 85, the ripple component may be balanced out, so that the signal between output terminal 92 of the ripple cancellation circuit and grounded wire 87 is substantially free of ripple.

The signal appearing at terminal 92 connected to tap 91a is passed through an appropriate coupling resistor 93 and a parallel capacitor 94 to a movable contact 42a of the chopper 42, which is of conventional construction. The output of the chopper 42 is fed to the input of a two-stage push-pull amplifier illustrated at 43, the details of which are also conventional. The output of the push-pull amplifier 43 is connected to the variably energized winding 44 of motor 13.

The variable gain amplifier 27 includes a network of four variable tapped resistors 95, 96, 97 and 98 fed from the output of tachometer 28. The taps on resistors 95 and 97 are connected through diodes 99 and 100 respectively and a resistor 101 to the grid of a triode 102. A variable tap resistor 103 and a fixed resistor 104 are connected in series with the cathode of triode 102. A resistor 105 and a parallel capacitor 106 connect the grid of triode 102 with the variable tap on resistor 103. That variable tap is also connected through a wire 107 to the common junction between resistors 96 and 98. The taps on resistors 96 and 98 are respectively connected to the grids of pentodes 108 and 109. The cathodes of pentodes 108 and 109 are connected to the wires 66 and 67 respectively, which lead to the variable gain input of amplifier 25.

The tachometer 28 produces an output potential which is a measure of the speed of the motor 13, and the polarity of which depends upon the direction in which the motor 13 runs. This potential is supplied to the grids of the pentodes 108 and 109, which amplify the signal and supply it to one of the windings 61 and 62 of the magnetic amplifier 25, the particular winding being selected in accordance with the polarity of the tachometer signal and hence in accordance with the direction of rotation of the motor 13. The triode 102 introduces a variable bias into the grid circuit of the pentodes 108 and 109, the value of that bias being determined by the setting of the tap on resistor 103, and by the amplitude (regardless of polarity—note diodes 99 and 100) of the tachometer output potential. This bias prevents any signal from the tachometer from reaching the magnetic amplifier 25 until the tachometer output has exceeded a preselected minimum. The connections must be selected so that the magnetizing force of the current in one of windings 61 and 62 opposes the magnetizing force of the current in winding 60 for one polarity of the latter current, while the current in the other one of windings 61 and 62 opposes current of the opposite polarity in winding 60. In other words, a current of one polarity in winding 60 must produce a response from motor 13 so that the tachometer signal supplied to winding 61 or 62 acts to oppose the magnetizing force of the current in winding 60.

The signal from the tachometer output acts as an automatic gain control to cut down the amplitude of the signals supplied to the motor 13 as the welding arc approaches the finishing end of the seam 1, where it is close to the pickup points 18 and 19. It is thereby effective to reduce hunting of the welding apparatus, particularly during the latter part of the weld.

FIG. 4

This figure illustrates a modification of the block diagram of FIG. 2, in which a somewhat different form of gain control is employed in place of the tachometer 28 and the variable gain amplifier 27 of FIG. 2.

Figure 4:
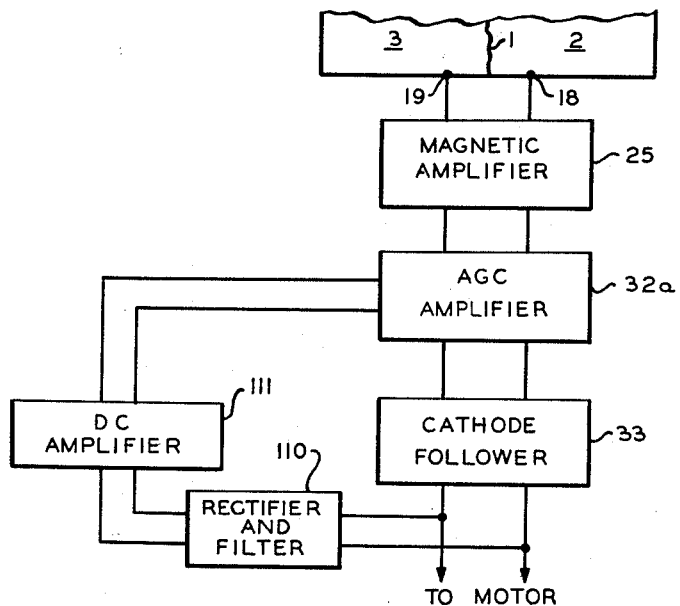
FIG. 4 is a block diagram showing a modification of FIG. 2.
Figure 5:
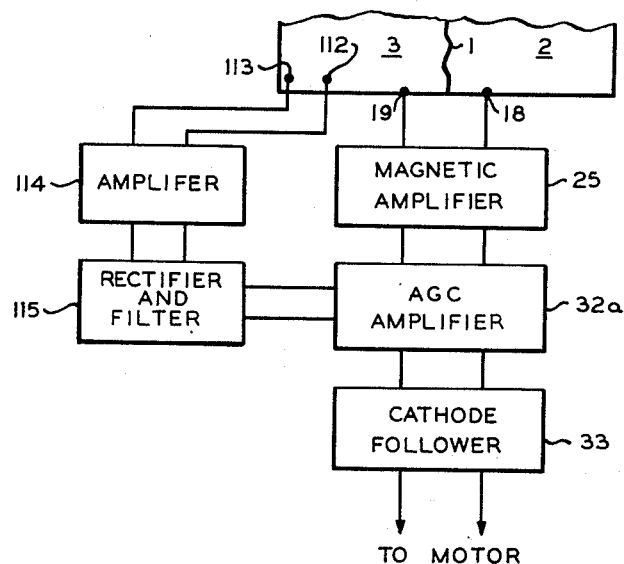
FIG. 5 is a block diagram showing another modification of FIG. 2.

In FIG. 4, part of the output of the cathode follower 33 is rectified and filtered in a network 110 provided for that purpose. The output of that network is amplified in an amplifier 111 and used as a variable bias on an amplifier 32a, which may be the same as the amplifier 32 in FIGS. 2 and 3, except for the variable bias arrangement. Again, the feedback from the output of the cathode follower acts as a type of automatic gain control.

FIG. 5

The block diagram in this figure illustrates a different motor control apparatus, similar to that of FIG. 4 except that the automatic gain control signal is derived from a different source. In this arrangement, two pickup points 112 and 113 are provided on the workpart 3 along the same finishing edeg of the workparts where the points 18 and 19 are located, but near the outside edge of the workpart 3. The potential difference between the points 112 and 113 is fed to an amplifier generally indicated at 114. The amplifier 114 may be of any suitable construction, and may for example include components similar to those in the magnetic amplifier 25, the amplifier 32 and the cathode follower 33. The output of amplifier 114 is fed to a rectifier and filter 115 whose output is in turn supplied to an automatic gain control amplifier 32a, where the signal from the rectifier and filter 115 is used as a variable bias to control the gain in the amplifier 32a.

The signal picked up due to the difference in potential between the points 112 and 113 depends upon the distance of those points from the welding arc. At the initiation of the weld, the arc is most remote from the points 112 and 113, and the signal there is weakest. The amplifier 32a then operates with its maximum gain. As the arc approaches the end of the weld, the signal between points 112 and 113 becomes stronger and is effective to reduce the control signal supplied to the motor and thereby to prevent hunting of the motor as the electrode approaches the end of the weld.

FIGS. 6 to 12

These figures illustrate seven different arrangements of workparts which may be welded successfully with the weld apparatus described in FIGS. 1 to 5. In each of these assemblies of workparts, the equipotential field pattern created in the workparts by the welding current is symmetrical with respect to the seam between the pieces.

Figure 6:
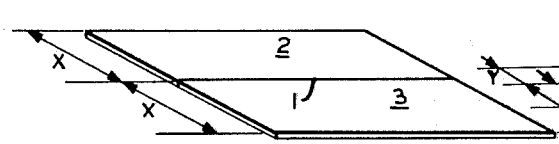
FIGS. 6 to 12 illustrate seven different forms of workparts with which the apparatus of FIGS. 1 to 5 may be successfully employed.

The arrangement shown in FIG. 6 is essentially equivalent to that of FIGS. 1 to 5, consisting of two rectangular pieces 2 and 3 of equal size, abutting each other along a seam 1.

Figure 7:
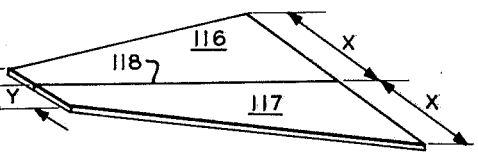

The arrangement of FIG. 7 differs from that of FIG. 6 in that the workparts 116 and 117 are trapezoidal rather than rectangular. Again, these workparts abut each other along a straight seam.

Figure 8:
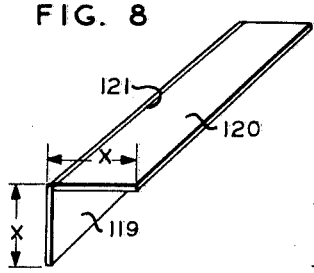

In FIG. 8, a workpart 119 abuts another workpart 120 at right angles, the seam appearing at 121 between a narrow side surface of the workpart 120 and one of the wider surfaces of the workpart 119.

Figure 9:
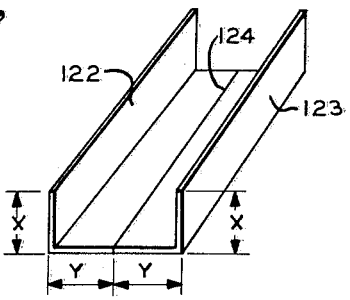

In FIG. 9, two workparts 122 and 123, each of L-shaped cross-section, abut each other along a seam 124 between the surfaces at one of the ends of the two L's.

Figure 10:
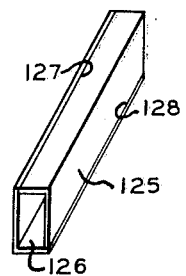

In FIG. 10, two workparts 125 and 126, each of L-shaped cross-section abut each other at both ends of the two L's so as to form a hollow rectangular conduit. The two seams are indicated at 127 and 128.

Figure 11:
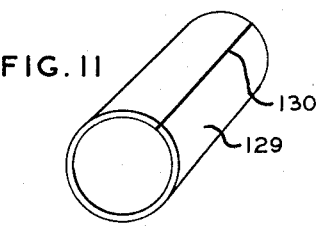

FIG. 11 shows a single piece of sheet metal 129 bent in the form of cylindrical tube having a straight seam 130 which appears as an element of the cylinder.

Figure 12:
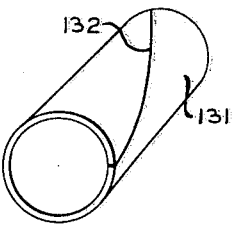

FIG. 12 shows a single piece of sheet material 131 bent to form a tubular conduit, with the seam 132 extending along a helical path around the conduit rather than a straight path as shown in FIG. 11.

FIGS. 13 and 14

These figures illustrate a modification of the invention which may be used when the two workparts are shaped so that the equipotential fields produced by the welding current are not symmetrical. For example, this arrangement is suitable for use where the seam to be welded is substantially curved or widely irregular.

These elements in FIGS. 13 and 14 which are the same as corresponding elements in FIGS. 1 and 2 have been given the same reference numerals and will not be further described.

The potential which is productive of welding current flow in the control circuit which locates the position of the welding head with respect to the seam is derived in FIG. 13 from two contact arms 133 and 134, which are pivotally mounted on and insulated, by means not shown, from the downwardly extending branches of a yoke 135 carried by the welding head 4. Each of the contact arms 133 and 134 is biased by a spring 135, 136 so that its lower end is held forcibly in engagement with one of the workparts. The two contact arms 133 and 134 are thus always at equal distances from the welding electrode, regardless of deviations of the seam from a symmetrical potential distribution configuration. The greater the distance between the contact arms 133 and 134, the greater the potential difference which may be measured across them. On the other hand, the closer they are to the electrode, the less likely they are to be disturbed by irregularities in the seam contour.

The apparatus of FIG. 13 has the advantage that the signal derived from the pickup arms does not vary with the travel of the welding head along the seam. Consequently, no automatic gain control is required, such as those described in FIGS. 2, 4 and 5.

It should be noted, however, that the system of FIGS. 13 and 14 is subject to possible error due to varying contact resistance between the arms 133 and 134 and the workparts. This contact resistance may be affected by varying surface conditions on the workparts. Furthermore, it should be noted that the signal produced in the apparatus of FIGS. 13 and 14 is affected by the position of the welding head with respect to the seam as well as by the position of the welding arc with respect to the seam. If for some reason the arc goes diagonally from the electrode to the workparts, a signal may be developed between the pickup arms 133 and 134 which will cause the welding head to be moved in a direction to correct that sidewise movement of the arc. This corrective movement may be produced, even though the arc may still be following the seam. This apparatus is, therefore, subject to possible errors from this source.

For all of these reasons, it is presently preferred to use the apparatus of FIGS. 1 to 5, even with the extra complication required by the gain control, in all situations where the workpieces are so shaped that the apparatus is practical. The apparatus of FIGS. 13 and 14 requires considerably more care and attention and consequently is used only where the workpiece shape dictates the necessity of its use.

While we have shown and described certain preferred embodiments of our invention, other modifications thereof will readily occur to those skilled in the art, and we, therefore, intend our invention to be limited only by the appended claims.

We claim:

1. Apparatus for welding a seam between abutting workparts, comprising a welder including a head, an electrode supported by the head and projecting toward the seam, first motor means for driving the head longitudinally of the seam, second motor means for driving the head transversely of the seam, means for supplying welding current to the electrode and to one of the workparts to support an arc between the electrode and the seam, means for energizing the first motor means, and means for reversibly controlling the second motor means, said second motor means and said controlling means cooperating when the electrode departs from a position in alignment with the seam, to drive the head in an alignment restoring direction, said reversible controlling means comprising pickup circuit means connecting two points on opposite sides of the seam, a source of square wave alternating current, means including said pickup circuit means for modifying the current from said source to indicate the direction and amplitude of current flow in said pickup circuit means, and means responsive to said modified current for energizing said second motor means.

2. Welding apparatus as defined in claim 1, in which: said source of square wave current supplies pulses of alternately opposite polarities spaced by relaxation periods relatively long as compared to the pulses; said current modifying means comprises means effective to block the pulses of one polarity or the other, depending on the direction of current flow in the pickup means, and to modulate the amplitude of the unblocked pulses, means for converting the unblocked pulses to a unidirectional signal, means to eliminate ripples from said signal; and said means for energizing the second motor means receives signals from the output of the ripple eliminating means.

3. Welding apparatus as defined in claim 1, in which the two points connected by the pickup circuit means are fixed in the respective workparts near the finishing end of the seam and are spaced substantially equal distances from the seam.

4. Welding apparatus as defined in claim 1, including a pair of contact elements carried by the head of the welder and engaging the workparts forcibly at points located on opposite sides of the seam and spaced equally from the electrode, said pickup circuit means connecting said two contact elements.

5. Apparatus for welding a seam between two abutting workparts, comprising a welder including a head, an electrode supported by the head and projecting toward the seam, first motor means for driving the head longitudinally of the seam, second motor means for driving the head transversely of the seam, means for supplying welding current to the electrode and to one of the workparts to support an arc between the electrode and the seam, means for energizing the first motor means, and means for reversibly controlling the second motor means, said second motor means and said controlling means cooperating when the electrode departs from a position in alignment with the seam, to drive the head in an alignment restoring direction, said reversible control means comprising a pair of contact elements carried by the head of the welder and engaging the workparts forcibly at points located on the opposite sides of the seam and spaced equally from the electrode, pickup circuit means connecting the two contact elements, a source of electrical energy, and an energizing circuit for said second motor means including said source and means responsive to the flow of welding current in said pickup circuit means for controlling the flow of current in said energizing circuit.

6. Apparatus for welding a seam between two abutting workparts, comprising a welder including a head, an electrode supported by the head and projecting toward the seam, first motor means for driving the head longitudinally of the seam, second motor means for driving the head transversely of the seam, means for supplying welding current to the electrode and to one of the workparts to support an arc between the electrode and the seam, means for energizing the first motor means, and means for reversibly controlling the second motor means, said second motor means and said controlling means cooperating when the electrode departs from a position in alignment with the seam, to drive the head in an alignment restoring direction, said reversible control means comprising pickup circuit means connecting two points located in the respective workparts on opposite sides of the seam and spaced substantially equal distances from the seam, a source of electrical energy and an energizing circuit for said second motor means including said source and means responsive to the flow of welding current in said pickup circuit means for controlling the flow of current in said energizing circuit.

7. Welding apparatus as defined in claim 6, in which said current flow controlling means includes variable gain amplifier means, and gain control means for operating the variable gain amplifier means.

8. Welding apparatus as defined in claim 7, in which said gain control means comprises a tachometer driven by said second motor means, and means responsive to the signal generated by the tachometer for controlling the gain of the amplifier means.

9. Welding apparatus as defined in claim 7, in which said gain control means comprises means responsive to the current flow in said pickup circuit means for controlling the gain according to an inverse function of the current flow.

10. Welding apparatus as defined in claim 7, in which said gain control means comprises gain pickup circuit means connecting third and fourth points in one of the workpieces and substantially aligned with at least one of said two points, and means responsive to the current flow in said gain pickup circuit means for controlling the gain of said amplifier means.

11. Apparatus for welding a seam between abutting workparts, comprising a welder including a head, an electrode supported by the head and projecting toward the seam, first motor means for driving the head longitudinally of the seam, second means including an alternating current motor for driving the head transversely of the seam, means for supplying welding current to the electrode and to one of the workparts to support an arc between the electrode and the seam, means for energizing the first motor means, and means for reversibly controlling the second motor means, said second motor means and said controlling means cooperating when the electrode departs from a position in alignment with the seam, to drive the head in an alignment restoring direction, said reversible controlling means comprising a source of square wave current pulses of alternately opposite polarity spaced by relaxation periods relatively long as compared to the pulses, a saturable core transformer having an output winding and a control winding, means connecting said control winding to points on opposite sides of the seam for supplying to said control winding a direct current signal of variable polarity and amplitude depending on the direction and departure of the electrode from a position of alignment with the seam, a load circuit, means connecting said source and said output winding in series with the load circuit, means for producing an amplified direct current signal varying in potential and amplitude as a function of the polarity and amplitude of the current flow in said load circuit, means for eliminating ripples of the pulse frequency from the amplified direct current signal, and means for converting the output of the ripple eliminating means to a substantially sinusoidal alternating current, and means for supplying the output of the converting means to said alternating current motor.

12. Apparatus as defined in claim 11 for controlling the alternating current motor, comprising a second control winding on said transformer, and means for supplying a gain control signal to said second control winding.

13. Apparatus for welding a seam between abutting workparts, comprising a welder including a head, an electrode supported by the head and projecting toward the seam, first motor means for driving the head longitudinally of the seam, second means including an alternating current motor for driving the head transversely of the seam, means for supplying welding current to the electrode and to one of the workparts to support an arc between the electrode and the seam, means for energizing the first motor means, and means for reversibly controlling the second motor means, said second motor means and said controlling means cooperating when the electrode departs from a position in alignment with the seam, to drive the head in an alignment restoring direction, said reversible controlling means comprising a source of square wave current pulses of alternately opposite polarity spaced by relaxation periods relatively long as compared to the pulses, a saturable core transformer having an output winding and a control winding, means connecting said control winding to points on opposite sides of the seam for supplying to said control winding a direct current signal of variable polarity and amplitude depending on the direction and departure of the electrode from a position of alignment with the seam, a load circuit, means connecting said source and said output winding in series with the load circuit, means for producing an amplified direct current signal varying in potential and amplitude as a function of the polarity and amplitude of the current flow in said load circuit, means for eliminating ripples of the pulse frequency from the amplified direct current signal, means for converting the output of the ripple eliminating means to a substantially sinusoidal alternating current having a phase dependent upon the polarity of the current in said load circuit and an amplitude dependent upon the amplitude of the current in said load circuit, and means for supplying the output of the converting means to said alternating current motor.

References Cited in the file of this patent

UNITED STATES PATENTS

| | | |
|---|---|---|
| 2,679,620 | Berry | May 25, 1954 |
| 2,921,179 | Anderson | Jan. 12, 1960 |
| 2,944,141 | Lovrenich | July 5, 1960 |
| 2,971,079 | Sommeria | Feb. 7, 1961 |